United States Patent
Shannon et al.

(10) Patent No.: US 8,871,125 B2
(45) Date of Patent: Oct. 28, 2014

(54) LAMINATES OF PARTIALLY SCORCHED ADHESIVE AND DVA FILM

(75) Inventors: Porter C. Shannon, Seabrook, TX (US); Michael J. Vinck, Lebbeke (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 204 days.

(21) Appl. No.: 13/330,233

(22) Filed: Dec. 19, 2011

(65) Prior Publication Data
US 2013/0157049 A1  Jun. 20, 2013

(51) Int. Cl.
  *B32B 25/00* (2006.01)
  *B29C 47/06* (2006.01)
  *B29C 47/12* (2006.01)

(52) U.S. Cl.
  USPC ........... 264/174.11; 264/173.12; 264/173.14; 264/173.16; 264/174.1; 264/209.6; 264/211.24

(58) Field of Classification Search
  None
  See application file for complete search history.

(56) References Cited

U.S. PATENT DOCUMENTS

| | | | |
|---|---|---|---|
| 5,066,435 A * | 11/1991 | Lorenz et al. | 264/40.5 |
| 5,143,677 A * | 9/1992 | Blemberg et al. | 264/171.27 |
| 5,927,855 A * | 7/1999 | Tomic et al. | 383/5 |
| 6,397,912 B1 * | 6/2002 | Watanabe et al. | 152/510 |
| 2002/0055006 A1 * | 5/2002 | Vogel et al. | 428/520 |
| 2002/0098339 A1 * | 7/2002 | Hanada et al. | 428/318.4 |
| 2003/0175538 A1 * | 9/2003 | Yamaguchi et al. | 428/515 |
| 2004/0081108 A1 | 4/2004 | Kloth et al. | |
| 2007/0031661 A1 * | 2/2007 | Kanenari | 428/355 BL |
| 2008/0254279 A1 * | 10/2008 | Murata et al. | 428/323 |
| 2009/0038729 A1 * | 2/2009 | Soeda et al. | 152/510 |
| 2009/0048472 A1 | 2/2009 | Banavali et al. | |
| 2009/0068476 A1 * | 3/2009 | Kirino | 428/448 |
| 2009/0218024 A1 * | 9/2009 | Tsou et al. | 152/450 |
| 2009/0311548 A1 * | 12/2009 | Kirino | 428/517 |
| 2009/0312458 A1 | 12/2009 | Stevenson et al. | |
| 2012/0015182 A1 * | 1/2012 | Caraway et al. | 428/354 |

FOREIGN PATENT DOCUMENTS

WO   WO2007/050236   5/2007

\* cited by examiner

*Primary Examiner* — Jeffrey Wollschlager
(74) *Attorney, Agent, or Firm* — Nancy T Krawczyk (57) ABSTRACT

A process to produce a laminate comprising coextruding a dynamically vulcanized alloy (DVA) film with an adhesive layer comprising a vulcanizable elastomeric composition through a die to produce the laminate. The process provides a residence time of the vulcanizable elastomeric composition in the melt to partially scorch the vulcanizable elastomeric composition. A melt of the DVA is in contact with the melt of the vulcanizable elastomeric composition in the die for at least 5 seconds, optionally also with a change in the area of the contact between the DVA film and the adhesive layer as it passes through the die, to increase the adhesion between the adhesive layer and the DVA layer relative to a shorter co-residence time. A laminate and a pneumatic tire comprising the laminate are also disclosed.

15 Claims, 3 Drawing Sheets

LAMINATES OF PARTIALLY SCORCHED ADHESIVE AND DVA FILM

BACKGROUND OF THE INVENTION

The present invention relates to thermoplastic elastomer-adhesive laminates particularly useful for tire and other industrial rubber applications, and processes for producing such laminates.

When preparing dynamically vulcanized alloy (DVA) tire innerliners for assembly with a tire carcass, the thermoplastic elastomer may be co-extruded together with an adhesive tie gum layer. If the adhesive layer has poor cured adhesion to either the DVA or the tire carcass, the innerliner can delaminate within the tire. In the tire assembly process, temperatures are used that do not necessarily melt the DVA layer, i.e., once the film is formed in the coextrusion operation, the DVA may never become molten again. The known coextrusion operation imparts limited curing between the adhesive layer and the DVA such that the adhesive layer may be peeled relatively easily by hand from the DVA layer. Additionally, if the film wrinkles such that two adhesive surfaces touch, and the wrinkle is pulled apart after 3 hours, one side of the adhesive may delaminate from the DVA. On the other hand, if the adhesive layer is heated too long in the coextrusion process or at a temperature that is too high above its vulcanization temperature, the adhesive may scorch excessively, resulting in crosslinking, gel formation and/or degradation in the adhesive layer, and thereby reducing its efficacy in the tire. There is thus a need to improve the cured adhesion between coextruded DVA and an adhesive layer, without adversely impacting co-curability to a rubber substrate.

SUMMARY OF THE INVENTION

In accordance with an embodiment of the invention, a process comprises coextruding a dynamically vulcanized alloy (DVA) film with an adhesive composition through a die, e.g., in a blown film extrusion line, to produce a laminate. In an embodiment, the adhesive composition in the laminate is partially scorched by providing a residence time in the melt that is sufficient to partially scorch the vulcanizable elastomeric composition. In an embodiment, the adhesion to the DVA film is improved by providing a co-residence time of a melt of the DVA in contact with a melt of the adhesive composition in the die of at least 5 seconds.

In another embodiment, the invention provides a laminate produced by the process. In a further embodiment, the invention provides a pneumatic tire comprising the laminate.

DETAILED DESCRIPTION OF THE INVENTION

Various applications of the present invention relate to blown film laminates for tire innerliner and barrier films, and more particularly to laminates of dynamically vulcanized alloy (DVA) and an adhesive or tie gum layer comprising a partially scorched vulcanizable elastomeric composition. In an embodiment, the adhesive layer provides enhanced or improved adhesion to the DVA through the partial scorching, and yet retains vulcanizability for co-curing and adhesion to the tire carcass.

The DVA in some embodiments may have an enhanced or maximized content of dispersed halogenated, brominated in one embodiment, isobutylene elastomers in the form of vulcanized particles dispersed in a continuous thermoplastic matrix. Additionally, in embodiments the DVA may be made using efficient mixing processes suitable for producing a thermoplastic elastomer composition capable of providing a rubber domain comprising small sized particles while such domains are also highly extensible and elastic. Furthermore, embodiments include processes for producing pneumatic tires and hoses using the DVA compositions. The elastomer in the DVA in one embodiment exhibits low permeability and can be a polymer such as halogenated isobutylene-containing elastomers and particularly brominated elastomers, especially brominated paramethylstyrene-co-isobutylene polymers, such as bromobutyl elastomers exhibiting high content of the structure illustrated hereinafter below, and commercial bromobutyl elastomers, or blends thereof with one or more of the aforementioned brominated elastomers with one another or with other polymers.

Throughout the entire specification, including the claims, the following terms shall have the indicated meanings:

Polymer may be used to refer to homopolymers, copolymers, interpolymers, terpolymers, etc. Likewise, a copolymer may refer to a polymer comprising at least two monomers, optionally with other monomers. All molecular weights are weight average unless otherwise noted.

When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds such as a conjugated diene like isoprene.

Elastomer or elastomers as used herein, refers to any polymer or composition of polymers consistent with the ASTM D1566 definition. The terms may be used interchangeably with the term "rubber(s)."

Substituted refers to the substitution of at least one hydrogen of the chemical compound or constituent.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. "Vulcanizable" refers to a composition capable of undergoing such curing reaction(s). "Co-curing" or "co-vulcanization" refers to the curing of two or more layers or articles of different compositions with surfaces in contact whereby the surfaces cannot be separated without tearing one or then both of the contacting layers or articles or are otherwise sufficiently adhered such that a tire containing them can be put to use.

For purposes of the present invention, absolute completion of such curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

Terms "partially scorched," "partially cured" or "partially vulcanized" refer to a vulcanizable elastomeric composition in which some elastomeric crosslinking or curing has occurred, as reflected by a substantial increase in viscosity, e.g., a 10 percent increase relative to the uncured composition, but in which the elastomeric composition remains sufficiently vulcanizable to adhesively co-cure in contact with another vulcanizable composition and obtain a satisfactorily, sufficiently or substantially cured, vulcanized or crosslinked laminate for use in a tire as previously mentioned.

The present invention in various embodiments comprises a process to produce a laminate comprising a DVA film and an adhesive layer. In an embodiment, the process comprises coextruding a DVA with an adhesive composition through a die to produce a laminate comprising a film of the DVA and a layer of the adhesive composition. In an embodiment, the DVA comprises a thermoplastic elastomer composition containing a thermoplastic resin as a continuous phase, and a rubber composition dispersed therein, as a dispersed phase. A thermoplastic elastomer composition suitable for use in the DVA is disclosed in co-assigned WO2007/050236, which is fully incorporated by reference herein. In an embodiment, the adhesive composition comprises a vulcanizable elastomeric composition. The process in one embodiment provides a residence time of the vulcanizable elastomeric composition in a molten state or "melt" to partially scorch the vulcanizable elastomeric composition, and a co-residence time of a melt of the DVA in a surface contact with the melt of the adhesive composition of at least 5 seconds. In other embodiments, the co-residence time is at least 7 seconds or at least 10 seconds.

In an embodiment, the process comprises changing an area of the contact surface between the dynamically vulcanized alloy melt and the adhesive composition melt during the co-residence time in the die. In an embodiment, the process comprises increasing the area of the contact surface between the dynamically vulcanized alloy melt and the adhesive composition melt during the co-residence time in the die by from 5% to 300% of an initial area of contact surface.

In an embodiment, the laminate has a Mocon air permeation coefficient of less than or equal to about $25 \times 10^{-12}$ cc cm/cm$^2$ sec cm Hg at 30° C.

In an embodiment, the adhesive layer has a self-tack of less than about 10 N/cm and/or a tack to an unvulcanized diene-based rubber of greater than or equal to about 10 N/cm.

In an embodiment, the thermoplastic of the continuous phase of the DVA comprises a polyamide and the rubber composition of the dispersed phase comprises a halogenated copolymer of isobutylene and paramethylstyrene.

In an embodiment, the adhesive composition comprises an epoxidized styrene-butadiene-based block copolymer. In an alternative or additional embodiment, the adhesive composition comprises functionalized groups reactive with amine groups in the thermoplastic resin of the dynamically vulcanized alloy, such as, for example, carboxylic acids, alkyl carboxylates, aldehydes, ketones, acyl halides and combinations thereof.

In an embodiment, the process further comprises co-vulcanizing the adhesive composition with the DVA.

In an embodiment, the thermoplastic elastomer composition comprises a plasticizer, such as, for example, butylbenzylsulfonamide (BBSA), poly(isobutylene succinic anhydride), or a combination thereof. In another embodiment, the thermoplastic elastomer composition is essentially free of BBSA, of poly(isobutylene succinic anhydride), or of added plasticizers.

In an embodiment, the process further comprises incorporating the laminate into a tire as an innerliner.

In another embodiment, in a process for producing a laminate comprising coextruding a DVA film with an adhesive composition through a die, e.g., in a blown film extrusion line, to produce the laminate, wherein the DVA film comprises a thermoplastic elastomer composition containing a thermoplastic resin as a continuous phase, and a rubber composition dispersed therein, as a dispersed phase, wherein the adhesive composition comprises a vulcanizable elastomeric composition, and wherein the vulcanizable elastomeric composition has a residence time in the blown film extrusion line in a molten state to partially scorch the vulcanizable elastomeric composition in the laminate, the invention provides a method to improve adhesion between the thermoplastic elastomer composition and the adhesive composition. In an embodiment, the method comprises increasing a co-residence time of a melt of the thermoplastic elastomer composition in contact with a melt of the vulcanizable elastomeric composition in the die to at least 5 seconds, or at least 7 seconds, or at least 10 seconds. In embodiments, the process further comprises changing an area of the contact surface between the melts during the co-residence time in the die, for example, increasing the area of the contact surface between the melts during the co-residence time in the die by from 5% to 300% of the initial contact surface area.

In another embodiment, the invention provides a laminate produced according to any of the methods described above.

In another embodiment, a pneumatic tire comprises the laminate produced according to any of the methods described above.

Co-Extrusion Process

Figure 1:
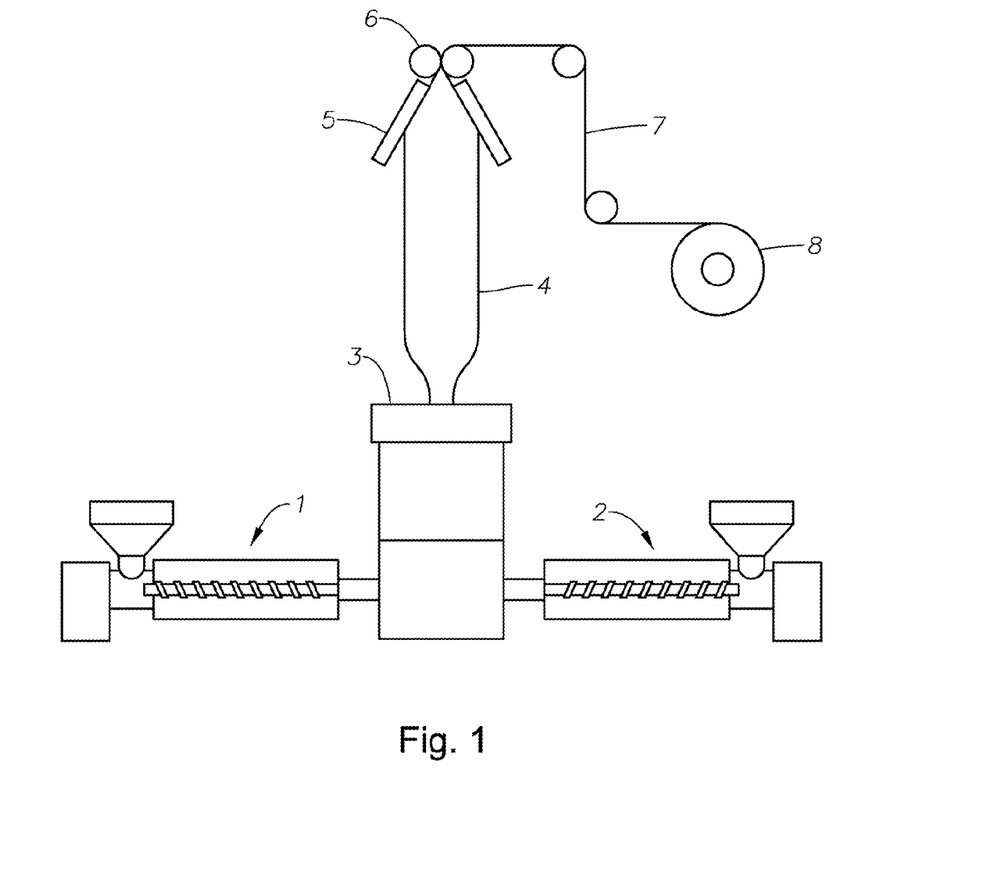
FIG. 1 is a schematic view of a blown film extrusion line for making a multilayer blown film according to an embodiment.

With reference to FIG. 1, a blown film extrusion line schematic is shown for carrying out the process of the invention according to one non-limiting embodiment. First and second extruders 1, 2 feed melt streams to the die 3, which forms an inflated bubble 4 extending to the guide tent 5 where it is taken up at the nip rolls 6, from which the webbing 7 is wound onto windup roll 8. In an embodiment, the DVA barrier composition is supplied via extruder 1, and the adhesive composition via extruder 2. As used herein, a blown film extrusion line is any line in which a polymer melt stream extruded from an annular slit die is formed into an inflated bubble and cooled to form a tubular film. While FIG. 1 shows the extruder in a horizontal orientation, this is not necessary or limiting for the present invention; one skilled in the art will appreciate that the equipment may also have a vertical orientation.

Figure 2:
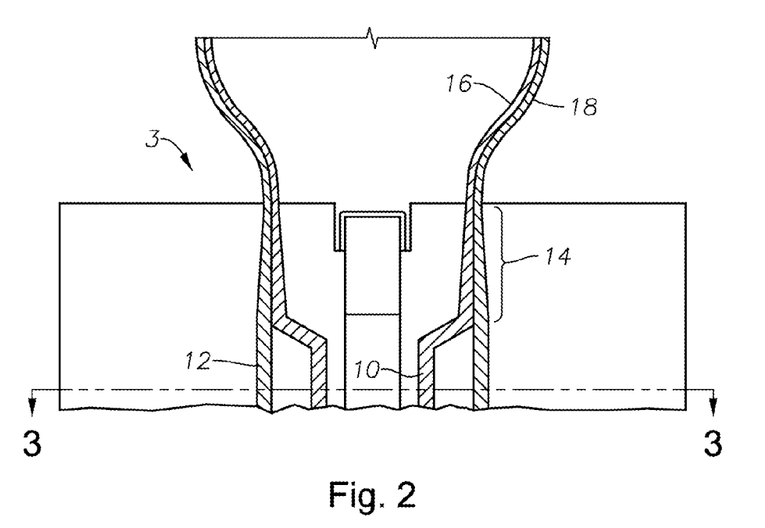
FIG. 2 is a schematic cross section of a coextrusion die with a high coextrusion residence time relative to the die of FIG. 4 according to an embodiment of the invention.
Figure 3:
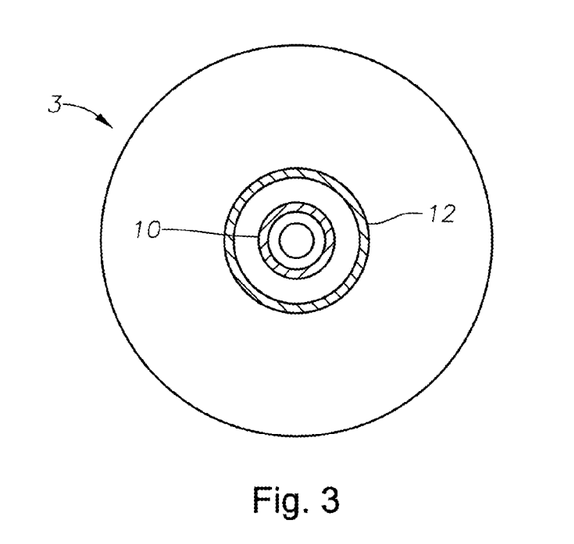
FIG. 3 is a transverse cross section of the coextrusion die of FIG. 2 as seen along the lines 3-3.

FIGS. 2 and 3 are enlarged schematic drawings of the die 3 in which an interior annular flow channel 10 and an exterior annular flow channel 12 supply respective streams of the barrier layer and adhesive composition to an annular co-residence zone 14, wherein the DVA barrier layer and adhesive composition have opposing surfaces in contact at an interface for a relatively long period of time for improved adhesion. While the extent of partial scorching of the adhesive composition is determined largely by the total thermal history in the extruder 2 and die 3, i.e., the time and temperature at which the adhesive composition is in the melt, the adhesion has been found to increase as the melts are in contact for a longer duration in the co-residence zone. In an embodiment, the area of melt stream contact is changed in the co-residence zone, e.g., by elongating or compressing the melts. For example, the width of the annular flow channel of the co-residence zone 14 can narrow as the melt flows towards the exit of the die 3, which tends to elongate and increase the linear flow velocity of the melt, increase the relative surface area and improve adhesion. Increased adhesion may result from promoting curing between the adhesive and barrier layer, or by another mechanism.

In one embodiment, the melt stream is elongated in at least one direction in the co-residence zone, e.g., to increase the contact surface area at an interface between the adhesive and barrier layer melts by from about 5% to about 300% of the initial contact surface area, or from 10% to 150% of the initial area, or from 20% to 100% of the initial area. The "initial area" can be taken as the product of the linear dimension of the interface transverse to the direction of flow, at the point where the barrier layer composition first contacts the adhesive composition, times the linear flow velocity at that point for a given unit of time. The interfacial contact area at a subsequent point is taken as the product of the linear dimension of the interface transverse to the direction of flow at that point and the linear flow velocity at that point. In a narrowing annular flow channel, the relative change in interfacial contact area can be calculated as follows: $\Delta A = (D_1 v_1/D_0 v_0 - 1) \ast 100$ (1); wherein $\Delta A$ is the percentage change in contact area, $D_0$ and $v_0$ are the diameter and flow velocity at the initial interface, and $D_1$ and $v_1$ are the diameter and flow velocity at the interface between the adhesive and the barrier composition at the subsequent point. For example, if $D_0$ and $D_1$ are the same and the cross-sectional flow area is halved so that $v_1 = 2v_0$, then the contact area is increased by 100%.

Figure 4:
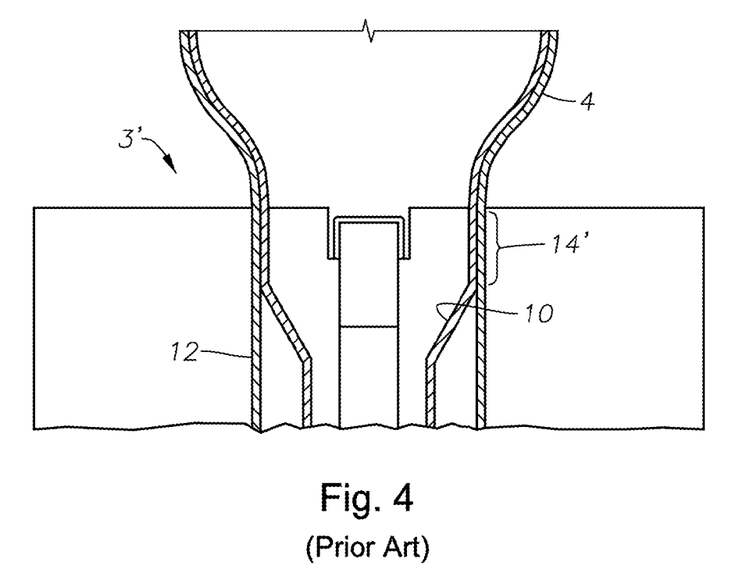
FIG. 4 is a schematic cross section of a coextrusion die with a low coextrusion residence time (prior art).

In FIG. 4, the corresponding prior art die 3' has a relatively shorter co-residence zone 14' and, while the scorch of the adhesive composition may be identical or very similar due to an identical or similar overall thermal history including upstream from the co-residence zone and downstream in the bubble, the adhesion can be poor.

In an embodiment, the barrier composition is supplied at a temperature above the melt temperature of the thermoplastic phase thereof, e.g. above 180° C., above 190° C., above 200° C., or above 210° C. In one embodiment, the barrier composition is previously dynamically vulcanized and is processed as a thermoplastic, and in another embodiment, the melt has a sufficiently high temperature for dynamic vulcanization in the melt extruder. In another embodiment, the barrier composition is supplied at a temperature from about 190° C. to about 250° C., e.g., from about 210° C. to about 240° C. Generally, a lower temperature is preferred to avoid overheating the adhesive layer and/or sublayer during the coextrusion therewith. On the other hand, the temperature should be sufficiently high to ensure flowability of the melt through the die.

In an embodiment, the adhesive composition is supplied at a temperature that is sufficient to ensure flowability in the coextrusion step, e.g., through the die. In an embodiment, the adhesive composition is supplied from the extruder 2 as a melt at a temperature from about 110° C. to about 180° C., for example, from about 120° C. to about 150° C. In a further embodiment, the adhesive composition is maintained during the coextrusion step at a temperature below about 180° C., or less than 160° C. or less than 140° C.

Figure 5:
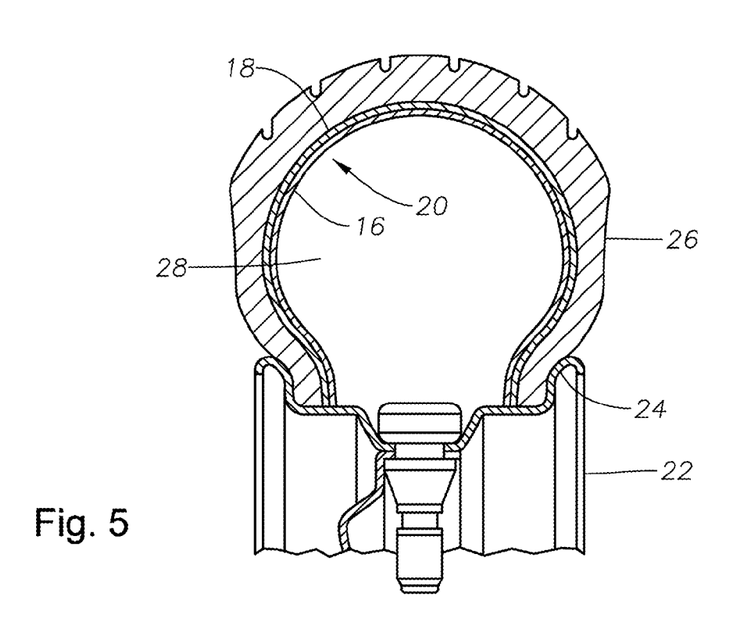
FIG. 5 is a cross section of a tire incorporating the laminate as an innerliner according to an embodiment.

The inflated bubble 4 cools to form the laminate 20 which comprises the barrier layer 16 and the adhesive layer 18, as best seen in FIG. 5.

Tire/Innerliner Assembly

The laminate according to embodiments of the invention can be used as a tire innerliner in one specific embodiment. FIG. 5 shows a schematic cross section of a pneumatic tire in which tire body 26 is mounted on the rim 22 at the flange 24 enclosing an air chamber 28. The laminate 20 forms an innerliner with adhesive layer 18 co-vulcanized at the inner surface of the tire body 26 and air barrier layer 16 facing the air chamber 28.

Thermoplastic Elastomer—Elastomer Component

The elastomer of the thermoplastic elastomer in the dynamically vulcanized alloy (DVA) layer in one embodiment comprises at least one halogenated isobutylene-containing rubber. Typically, it is present in a composition with a thermoplastic resin described hereinbelow, in a weight ratio of rubber to resin of about 55/45 to 80/20; preferably about 60/40 to about 75/25; more preferably about 65/35 to about 75/25. Halogenated rubber is defined as a rubber having at least about 0.1 mole % halogen, such halogen selected from the group consisting of bromine, chlorine and iodine. Preferred halogenated rubbers useful in this embodiment include halogenated isobutylene-based homopolymers or copolymers. These polymers can be described as random copolymer of a $C_4$ to $C_7$ isomonoolefin derived unit, such as isobutylene derived unit, and at least one other polymerizable unit. In one embodiment, the halogenated isobutylene-based copolymer is a butyl-type rubber or branched butyl-type rubber, especially brominated versions of these elastomers.

Butyl rubbers are typically prepared by reacting a mixture of monomers, the mixture having at least (1) a $C_4$ to $C_{12}$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene and dichlorostyrene are also suitable for homopolymerization or copolymerization in butyl rubbers. One embodiment of the butyl rubber polymer useful in an embodiment is obtained by reacting 95 to 99.5 wt % of isobutylene with 0.5 to 8 wt % isoprene, or from 0.5 wt % to 5.0 wt % isoprene in yet another embodiment.

Halogenated butyl rubber is produced by the halogenation of the butyl rubber product described above. Halogenation can be carried out by any means, and the embodiments herein are not limited by the halogenation process. In one embodiment, the butyl rubber is halogenated in hexane diluent at from 4 to 60° C. using bromine ($Br_2$) or chlorine ($Cl_2$) as the halogenation agent. Post-treated halogenated butyl rubber can also be used, as disclosed in U.S. Pat. No. 4,288,575. The halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %.

Another useful embodiment of butyl rubber is halogenated, branched or "star-branched" butyl rubber. In one embodiment, the star-branched butyl rubber ("SBB") is a composition comprising butyl rubber and a polydiene or block copolymer. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the embodiments are not limited to the type of polydiene or branching agent used to make the SBB.

The SBB used may be halogenated. In one embodiment, the halogenated star-branched butyl rubber ("HSBB") comprises a butyl rubber, either halogenated or not, and a polydiene or block copolymer, either halogenated or not. In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

Other useful butyl rubbers are isoolefin/para-alkylstyrene copolymers that include random copolymers comprising a $C_4$ to $C_7$ isoolefin, such as isobutylene, and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90% by weight of the para-isomer. The "halo" group can be any halogen, desirably chlorine or bromine, most preferably bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Preferred isoolefin copolymers can include monomers selected from the group consisting of isobutylene or isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Preferred isoolefin copolymers may also further comprise multiolefins, preferably a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Desirable styrenic monomers in the isoolefin copolymer include styrene, methylstyrene, chlorostyrene, methoxystyrene, indene and indene derivatives, and combinations thereof.

Most useful of such copolymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed halogenated poly(isobutylene-co-p-methylstyrene) or brominated poly(isobutylene-co-p-methylstyrene) (BIMS). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646, modified) is about 30 to about 60 Mooney units.

Thermoplastic Elastomer—Secondary Elastomer Components

Optionally, other rubbers or elastomers can be used in combination with the halogenated isobutylene-containing elastomer. Such an optional rubber component includes high diene rubbers and their hydrates. High diene content rubbers or elastomers are also referred to as high diene monomer rubber. It is typically a rubber comprising typically at least 50 mole % of a $C_4$-$C_{12}$ diene monomer, typically at least about 60 mole % to about 100 mole %; more preferably at least about 70 mole % to about 100 mole %; more preferably at least about 80 mole % to about 100 mole %. Useful high diene monomer rubbers include homopolymers and copolymers of olefins or isoolefins and multiolefins, or homopolymers of multiolefins. Generally, other optional rubbers useful in the present embodiments include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR, olefin rubbers (for example, ethylene propylene rubbers (including both EPDM and EPM), maleic acid-modified ethylene propylene rubbers (M-EPM), butyl rubber (IIR), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

A second rubber component that is more efficient in reducing low temperature modulus than BIMS can be advantageous for improving low temperature performance of the overall composition. Preferably, the secondary rubber is based on functionalized rubbers exhibiting low glass transition temperatures, Tg, preferably less than −30° C. The low Tg contributes to reduced modulus (enhanced softness) of the secondary rubber at operating or use temperatures of products containing such rubbers, for example, tire innerliners, of about −20° C. or less. Suitable functionality includes maleic anhydride, acyllactam, or others that can readily react with amine functionality present in polyamides. The presence of chemically reactive functionality in such rubbers further promotes reactive compatibilization between the secondary rubber and polyamide leading to a small particle size dispersion of the rubber in the polyamide matrix, the particles exhibiting an average particle size of about 1 micron or less; preferably less than about 0.5 micron.

The secondary rubber, dispersed in the polyamide matrix in the form of small particles, as noted, can optionally be cured, crosslinked or vulcanized, partially, substantially or fully, as described with regard to the halogenated or BIMS elastomer. Such crosslinking can be accomplished in the course of dispersing the secondary rubber in the polyamide matrix by using the same dynamic vulcanization method applied to the halogenated elastomer component. If dynamic vulcanization is used, it is also necessary to disperse a suitable curing agent or curing system in the secondary rubber in order to effect vulcanization during mixing and dispersion of the rubber.

Alternatively, if the secondary rubber is susceptible to thermal crosslinking, it can be vulcanized by the application of sufficient thermal energy either during mixing and dispersion in a manner corresponding to dynamic vulcanization, or after it is dispersed in the form of small particles by providing sufficient thermal energy to accomplish such crosslinking after dispersion. In any event, it is preferred that the secondary rubber be dispersed in the polyamide matrix in the form of small particles having an average particle size of about 0.1 micron to about 1 micron; for example about 0.1 micron to about 0.75 micron; or about 0.1 micron to about 0.5 micron.

Thermoplastic Elastomer—Thermoplastic Resin Component

In embodiments, a useful thermoplastic resin is defined to be any thermoplastic homopolymer, copolymer or mixture thereof having a Young's modulus of more than 500 MPa and, preferably, an air permeation coefficient of less than $60 \times 10^{-12}$ cc-cm/cm$^2$-sec-cm Hg (at 30 C), and, preferably, a melting point of about 170° C. to about 230° C., including, but not limited to, one or more of the following:

a) polyamide resins: nylon 6 (N6), nylon 66 (N66), nylon 46 (N46), nylon 11 (N11), nylon 12 (N12), nylon 6,10 (N610), nylon 6,12 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins (for illustration, not limitation): vinyl acetate (EVA), polyvinyl alcohol (PVA), vinyl alcohol/ethylene copolymer (EVOH), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE), tetrafluoroethylene/ethylene copolymer (ETFE);

h) polyimide resins: aromatic polyimides);

i) polysulfones;

j) polyacetals;

k) polyactones;

l) polyphenylene oxide and polyphenylene sulfide;

m) styrene-maleic anhydride;

n) aromatic polyketones; and o) mixtures of any and all of a) through n) inclusive as well as mixtures of any of the illustrative or exemplified thermoplastic resins within each of a) through n) inclusive.

For purposes of the present invention, this definition of thermoplastic resin excludes polymers of olefins, such as polyethylene and polypropylene.

Preferred thermoplastic resins include polyamide resins and mixtures thereof; particularly preferred resins include Nylon 6, Nylon 6/66 copolymer, Nylon 11, Nylon 12, Nylon 610, Nylon 612 and their blends. According to an alternative preferred embodiment of the present invention, the thermoplastic elastomer composition may be formulated using a thermoplastic resin component where the nylon resin component comprises Nylon 11 or Nylon 12, and Nylon 6/66 copolymer in a ratio of composition (ratio by weight) of about 10/90 to about 90/10; preferably about 30/70 to about 85/15. Such a thermoplastic elastomer composition based on blended resins can provide a thermoplastic elastomer composition having superior durability and appearance, e.g., of the cured surface of a tire innerliner as well as superior air retention properties, as well as demonstrating a good balance of these properties.

Thermoplastic Elastomer—Other Components

Since the thermoplastic resin and the halogenated isobutylene-containing rubber differ significantly in solubility, a compatibilizing ingredient may be useful for the purposes of enhancing compatibility of these polymers. Furthermore, without wishing to be bound by theory, the fine rubber dispersions obtained in the compositions of some embodiments may be the result, in part, of chemical reaction(s) between, e.g., benzylic bromine present in BIMS, or allylic halogen in halogenated butyl, and terminal amines in thermoplastic polyamides at the phase boundary between the dispersed rubber particles and the thermoplastic which are formed during mixing and potentially by modifying, in particular reducing, the surface tension between the rubber and thermoplastic resin components. The occurrence of interfacial reactions during blending and simultaneous reaction of two immiscible polymers can help to avoid coalescence of the small particle-size dispersed rubber phase, thereby leading to particularly fine dispersions of the rubber phase. At the same time, because of the interfacial stability in these reactive compatibilized immiscible systems, phase inversion of the higher concentration, lower viscosity polymer blend component, the rubber phase, is inhibited as a consequence of the stabilizing effect of interfacial compatibilization.

Secondary polymers may function as compatibilizers and can include ethylenically unsaturated nitrile-conjugated diene-based high saturation copolymer rubbers (HNBR), epoxylated natural rubbers (ENR), NBR, hydrin rubbers, acryl rubbers and mixtures thereof. Other compatibilizers include copolymers such as those having the structure of both or one of the thermoplastic resin and rubber polymer or a structure of a copolymer having an epoxy group, carbonyl group, halogen group, amine group, maleated group, oxazoline group, hydroxy group, etc. capable of reacting with the thermoplastic resin or rubber polymer. The secondary rubber can be selected based upon the type of the thermoplastic resin polymer and rubber polymer to be mixed. Such useful secondary rubbers include maleic anhydride grafted rubbers such as maleic anhydride grafted acrylonitrile-butadiene-styrene, maleic anhydride grafted ethylene-propylene-diene rubber, maleic anhydride grafted styrene-ethylene/butadiene-styrene, and the like and maleated ethylene copolymer rubbers such as maleated ethylene-propylene (EPM), maleated ethylene-butene, maleated ethylene-hexene, maleated ethylene-octene, maleated ethylene-decene, maleated ethylene-propylene-diene, maleated ethylene-vinyl acetate, maleated ethylene-methyl acrylate, maleated ethylene-ethyl acrylate, maleated ethylene-acrylic acid, and the like and mixtures thereof. Also potentially useful rubbers include EPDM/styrene, EPDM/acrylonitrile graft copolymer and their maleic acid-modified forms; styrene/maleic acid copolymer; reactive phenoxy thermoplastic resin; and their mixtures.

Examples of useful, preferred functional groups present in the secondary rubber include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used. Examples of particularly preferred functional groups include, but are not limited to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Polymers suitable to make functionalized polymers useful herein include ethylene polymers and propylene polymers. Particularly preferred polymers include polymers of ethylene copolymerized with one or more of propylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such ethylene polymers are modified with maleic acid or maleic anhydride. Another class of particularly preferred polymers includes polymers of propylene copolymerized with one or more of ethylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such propylene polymers are modified with maleic acid or maleic anhydride.

In a preferred embodiment, the polymer to be functionalized is grafted with maleic anhydride so the maleic anhydride is covalently bonded to the backbone polymer chain of the polymer. The anhydride functionality grafted onto the polymer may remain as an anhydride, may be oxidized into acid functional groups, and/or may be further reacted by processes known in the art to introduce other functional groups such as amides, amines, alcohols, and the like.

Another class of particularly preferred polymers include polymers of a $C_4$ to $C_7$ isoolefin (such as isobutylene) copolymerized with one or more of isoprene, isobutylene. Preferably such isobutylene polymers are modified with maleic acid or maleic anhydride. Particularly preferred functionalized polymer include maleated copolymers of isobutylene and isoprene, maleated copolymers of isobutylene and paramethylstyrne, maleated halobutyl type copolymers, maleated SBB type copolymers and maleated BIMS type copolymers. Various methods are known in the art that may be used for functionalizing polymers. These include, but are not limited to, selective oxidation, free radical grafting, ozonolysis, epoxidation, and the like.

Preferably, the functionalized polymer comprises maleic anhydride present at a concentration selected from the group consisting of less than about: 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, and 2 wt % maleic anhydride. Also preferably the level of maleic anhydride (MA) in the polymer-g-MA may be greater than about 0.1 wt %, preferably greater than about 0.5 wt %, alternately greater than about 1 wt % maleic anhydride. In a preferred embodiment, the functionalized polymer may comprise about 0.1 to about 10 wt % maleic anhydride; preferably about 0.25 to about 5 wt %; more preferably about 0.5 to about 4 wt %; still more preferably about 0.75 to about 3.5 wt %; such as about 1.5 to about 2.5 wt % of maleic anhydride. The functional group content of the grafted polymer may be determined by Fourier Transform Infrared (FTIR) spectroscopy based on a calibration with standards whose absolute functional group content has been determined.

By having another rubber, the overall rubber content, counting both BIMS rubber and at least one secondary rubber, can be increased in the thermoplastic elastomer composition while maintaining a desirable morphology including small particle size dispersion of the rubber components in the polyamide matrix. The increase in maximum rubber content can be realized particularly in view of the restricted coalescence of the BIMS particles when in the presence of an immiscible secondary rubber. Furthermore, by controlling the amount of the secondary rubber concentration at a low or minor level as described above, it is possible to avoid the need to cure or vulcanize the secondary rubber in order to substantially avoid or prevent its coalescence. This is particularly true since the secondary rubber is reactive in the presence of and with the polyamide and becomes substantially immobilized. Without the need to add curatives to the secondary rubber it is then unnecessary to pre-mix or to pre-compound it with curatives (although curatives can optionally be added and the secondary rubber dynamically vulcanized using the same technology as for BIMS), and direct addition of the secondary rubber to the extruder mixer is feasible during extrusion mixing; the secondary rubber preferably is provided in pellet form. Furthermore, since most functionalized rubbers, such as maleated ethylene copolymer rubbers and maleic anhydride grafted rubbers, are fairly permeable, it is desirable to keep the secondary rubber concentration low, typically not more than 20 wt %; preferably about 1 wt % to about 20 wt %; more preferably about 1 wt % to about 10 wt % or less, based on the total weight of the overall composition. The amount of the secondary, functionalized compatibilizer rubber blended is typically not more than about 20 wt %; preferably less than about 10 wt %; generally about 0.5 wt % to about 20 wt %; for example about 5 wt % to about 15 wt %; such as about 7.5 wt % to about 12.5 wt %.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." A cure system is used because typically more than one curing agent is employed for beneficial effects, particularly where a mixture of high diene rubber and a less reactive elastomer is used.

For purposes of dynamic vulcanization in the presence of a thermoplastic resin to form, for example, a highly impermeable layer or film, any conventional curative system which is capable of vulcanizing saturated or unsaturated halogenated polymers may be used to vulcanize at least the elastomeric halogenated copolymer of a $C_4$ to $C_7$ isomonoolefin and a para-alkylstyrene. Dynamic vulcanization according to an embodiment can occur prior to, during and/or following coextrusion, preferably prior to or during the coextrusion step or process, and especially during coextrusion with the adhesive layer and sublayer.

Crosslinking or curing agents include at least one of, e.g., sulfur, zinc oxide, and fatty acids and mixtures thereof. Generally, polymer compositions may be crosslinked by adding curative agents, for example sulfur, metal oxides (i.e., zinc oxide, ZnO), organometallic compounds, radical initiators, etc. and heating the composition or mixture. The following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. Suitable curative systems for the elastomeric halogenated copolymer component of the present invention include zinc oxide in combination with zinc stearate or stearic acid and, optionally, one or more of accelerators or vulcanizing agents. Peroxide curatives are specifically excluded from the thermoplastic elastomer in an embodiment when there is present one or more thermoplastic resins that would cause such the resins to crosslink themselves in the presence of peroxide, resulting in an excessively cured, non-thermoplastic composition.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally, the entire available curative is consumed in the formation of effective crosslinks which join individual polymer chains to one another and enhance the overall strength of the polymer matrix. Numerous accelerators are known in the art. Curatives, accelerators and the cure systems of which they are a part that are useful with one or more crosslinkable polymers are well-known in the art.

The cure system can be dispersed in a suitable concentration into the rubber component, the rubber component optionally containing one or more filler, extender and/or plasticizer by, e.g., mixing the rubber and the cure system components in a process step prior to addition of the rubber-containing composition to the thermoplastic using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization, although this is difficult to control in a commercial, practical, integrated process and is less desirable. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization. By so doing, the precompounded rubber composition can be pelletized for more efficient and effective feeding to the dynamic vulcanization equipment, preferably a mixing extruder, as described below.

In one embodiment of the invention, at least one curing agent is typically present at about 0.1 to about 15 phr; alternatively at about 0.5 to about 10 phr.

The preferred polymer components comprise halogenated isobutylene-containing copolymers as the vulcanizable component(s), e.g., halogenated butyl such as chlorinated butyl or brominated butyl, and brominated isobutylene-p-methylstyrene copolymer (BIMS copolymer), and a thermoplastic polymer such as nylon or a blend of various nylon polymers. It is particularly preferred that the dynamically vulcanized compositions of the present invention comprise the halogenated rubber component(s) in the form of dispersed, substantially fully cured, small particles in a continuous matrix of thermoplastic. The dynamically vulcanized halogenated rubber component is preferably dispersed in the polyamide matrix in the form of small particles having an average particle size of about 0.1 micron to about 1 micron; for example about 0.1 micron to about 0.75 micron; or about 0.1 micron to about 0.5 micron. Particle size can be determined by methods well known in the art and including tapping phase atomic force microscopy (AFM).

For purposes of the present invention, the BIMS component is also referred to as a low-grafting efficiency elastomer and the secondary rubbers are referred to as high-grafting efficiency rubbers. In each instance, grafting refers to grafting onto the polyamide(s) that are present in the composition. This distinction in efficiency and the method for measuring the performance of the polymers are described further below.

Generally, the term "dynamic vulcanization" is used to denote a vulcanization process in which a thermoplastic resin and at least one vulcanizable rubber are mixed under conditions of high shear and elevated temperature in the presence of a curing agent or curing system for the rubber(s). As a result, the rubber is simultaneously crosslinked and dispersed as particles, preferably in the form of a microgel, within the resin which forms or is present as a continuous matrix. The resulting composition is known in the art as a "dynamically vulcanized alloy" or DVA. Typically, dynamic vulcanization is effected by mixing the ingredients at a temperature which is at or above the curing temperature of the rubber, and at or above the melting temperature of the resin. The unique characteristic of the dynamically vulcanized or cured composition is that, notwithstanding the fact that the rubber is cured the composition can be processed and reprocessed by conventional thermoplastic processing techniques such as extrusion, injection molding, compression molding, etc. Scrap and or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. However, the dynamic vulcanization process can be modified, as described below, in order to achieve further advantages.

It will be appreciated that the vulcanizable rubber, typically the first rubber, for example the halogenated isobutylene elastomer such as BIMS (or a mixture of such rubbers), will be cured to at least 50% of the maximum state of cure of which it is capable based on the cure system, time and temperature, and typically, the state of cure of such rubber will exceed 50% of maximum cure. Since the second rubber can also comprise a vulcanizable rubber, where such second rubber is vulcanized, for example according to dynamic vulcanization technology as described herein, it too typically will be cured to at least 50% of the maximum state of cure of which it is capable based on its curative or cure system and the time and temperature at which it is processed. Alternatively, as discussed herein, such second rubber can also be grafted, linked and/or associated with the polyamide resin, with or without the use of curatives, so that its state of cure is not a limitation, provided that it is sufficiently dispersed in a small enough particle size so as to provide the properties desired for the use to which the composition will be put. Conversely, it may be desirable to cure the rubber particles to less than the maximum state of cure of which the rubber is capable so that the flexibility, as measured, for example, by Young's modulus, of the rubber component(s) is at a suitable level for the end use to which the composition is to be put, e.g., a tire innerliner or hose component. Consequently, it may be desirable to control the state of cure of the rubber(s) used in the composition to be less than or equal to about 95% of the maximum degree of cure of which they are capable, as described above.

Dynamic vulcanization can be carried out in various types of commercial equipment generally available in the rubber and plastics industry including Banbury® internal mixers, roll mixers, and mixing extruders. In an embodiment herein, the dynamic vulcanization of the barrier composition is effected during the coextrusion with the adhesive compositions in the outer adhesive layer and the adhesive sublayer, e.g. in an extruder supplying the melt to the coextrusion die. A preferred mixing device is a twin-screw extruder with intermeshing screws. Mixing is generally conducted under such time and temperature conditions that the dispersed rubber particles, particularly the first rubber component, are dispersed and cured and/or interact with the polyamide to the extent necessary to maintain their stability, i.e., to avoid coalescence of such particles at the completion of mixing the composition. A suitable range of dynamic vulcanization temperatures is typically from about the melting temperature of the resin(s) to less than about 300° C.; for example, the temperature may range from about the melting temperature of the matrix resin(s) to about 275° C.; preferably about 230° C. to about 265° C.; alternatively, about 235° C. to about 260° C.; such as about 240° C. to about 260° C.; for example, about 230° C. to about 250° C. In one embodiment, dynamic vulcanization is carried out at a temperature from about 210° C. to about 230° C. Alternatively, dynamic vulcanization can be carried out at a temperature range from about 10° C. to about 50° C. above the melting temperature of the matrix resin; more preferably about 20° C. to about 40° C. above the melting temperature of the polyamide or mixed polyamide thermoplastic matrix.

The thermoplastic elastomer composition thus obtained is structured with the elastomer component forming a discontinuous phase dispersed as a dispersion phase (domain) in a matrix of the nylon resin which forms a continuous phase. As a consequence of dynamic vulcanization, the composition remains thermoplastic and a film, layer or sheet like structure of the composition can be formed into a laminate with an adhesive outer layer and adhesive sublayer by co-extrusion according to one embodiment.

By molding the thermoplastic elastomer composition obtained into a sheet, film, or tube using a T-sheeting die, straight or crosshead structure tubing die, inflation molding cylindrical die, etc. at the end of a single-screw extruder, or by calendering, it is possible to use the composition as the air permeation preventive layer, e.g., an innerliner, of a pneumatic tire and as a component or layer of a hose, etc.

The sheet or tubular molded article thus obtained can be effectively used for an innerliner layer of a pneumatic tire or the hose tube or hose cover of a low gas permeable hose. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled.

Adhesive Layer

The composition of the adhesive layer can be any vulcanizable elastomer, such as, any one of the rubbers described above as the elastomer component in the dynamically vulcanized alloy (DVA), for example, butyl rubbers or halogenated isobutylene-containing rubbers. Alternative or additional adhesive layer elastomers may include high diene rubbers and their hydrates. High diene content rubbers or elastomers are also referred to as high diene monomer rubber. It is typically a rubber comprising typically at least 50 mole % of a $C_4$-$C_{12}$ diene monomer, typically at least about 60 mole % to about 100 mole %; more preferably at least about 70 mole % to about 100 mole %; more preferably at least about 80 mole % to about 100 mole %. Useful high diene monomer rubbers include homopolymers and copolymers of olefins or isoolefins and multiolefins, or homopolymers of multiolefins. Generally, other rubbers useful in the embodiments of the adhesive layer, alone or in combination with another rubber, include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR, olefin rubbers (for example, ethylene propylene rubbers (including both EPDM and EPM), maleic acid-modified ethylene propylene rubbers (M-EPM), butyl rubber (IIR), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Specific examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures. As the diene-based rubber, any diene-based rubber usable for a tire, including those mentioned above, for example, natural rubber (NR), polyisoprene rubber (IR), various types of styrene-butadiene copolymer rubber (SBR), various types of polybutadiene rubber (BR), acrylonitrile-butadiene copolymer rubber (NBR), and further an ethylene-propylene-diene copolymer (EPDM), (halogenated) butyl rubber, etc. may be mentioned. These may be used alone or in any blend thereof.

In an embodiment, the adhesive compositions may comprise a thermoplastic elastomer, which can comprise a mixture of any thermoplastic resin and any elastomer, including those mentioned above for the barrier composition.

In an embodiment, the adhesive composition comprises as the matrix polymer any of various styrene-butadiene-based block copolymers (SBS), various styrene-isoprene block (SIS) copolymers, and their partial hydrogenates, including mixtures and combinations thereof, and the like.

In an embodiment, the adhesive composition may comprise an epoxy-modified, i.e., epoxylated SBS (ESBS) having an oxirane oxygen functionality. This epoxy modification may be carried out by epoxylating, for example, a styrene-butadiene-based block copolymer (SBS) using peracids, hydroperoxides or the like. As peracids, performic acid, peracetic acid, perbenzoic acid, trifluoroperacetic acid, etc. may be mentioned. Further, as hydroperoxides, hydrogen peroxide, t-butyl hydroperoxide, cumene peroxide, etc. may be mentioned. If the oxirane oxygen content of the ESBS thus obtained is too low, the bondability of the adhesive layer with the dynamically vulcanized alloy (DVA) layer is liable to deteriorate, and therefore, this is not preferred, while conversely if it is too high, the bondability with the tire rubber is liable to deteriorate, and therefore, this is not preferred.

In an embodiment, the adhesive composition may comprise ESBS with an oxirane oxygen content effective to bond with the thermoplastic elastomer layer, and the adhesive composition of the outer layer has a lower oxirane oxygen content than the sublayer. In a further embodiment the adhesive composition may comprise a curing agent in an amount effective for co-curing with a diene rubber with which it is placed in contact, e.g., in the adhesion of the film as an innerliner onto the rubber surface of a tire carcass, and the adhesive composition. In an embodiment, the adhesive composition may comprise a total of 100 parts by weight of the thermoplastic elastomer wherein the thermoplastic elastomer contains at least 50 parts by weight of the ESBS, preferably 60 to 100 parts by weight, so that an oxirane oxygen content becomes 1 to 5% or 1 to 3% by weight, preferably 1.2 to 2.8% by weight, by weight of the layer or sublayer.

In an embodiment, the adhesive composition does not include, or specifically excludes an epoxidized thermoplastic elastomer. In an embodiment, the adhesive composition, and thus the laminate is subject to the proviso that the adhesive does not include an epoxidized styrene-butadiene-based block copolymer having an oxirane oxygen content of 1 to 3% by weight. An example of the type of adhesive specifically excluded is found in published U.S. Patent Application No. US2007/0031661, which is incorporated by reference herein for teachings related to such adhesive compositions.

In an embodiment, the adhesive composition of the adhesive layer may comprise a tackifier. In an embodiment, the adhesive composition generally comprises a total of 100 parts by weight of a thermoplastic elastomer and from 30 to 200 parts by weight, preferably 40 to 120 parts by weight of a tackifier, and optionally, from 0.1 to 15 parts by weight, preferably 0.5 to 10 parts by weight of a cure agent. In one embodiment, the tackifier is selected from aliphatic resins such as, for example, piperylene resins and terpene resins, and aromatic modified aliphatic resins, as well as combinations thereof, and the like. Suitable tackifiers herein are commercially available under the trade designations ESCOREZ (ExxonMobil Chemical Co.), e.g., ESCOREZ 1102, ESCOREZ 1310, ESCOREZ 1315; and YS Resin (Yasuhara Chemical), e.g. YS Resin D105.

In an embodiment, the tackifier comprises a piperylene resin having a softening point from 70° to 140° C. and a number average molecular weight Mn from 800 to 1600.

In another embodiment, the tackifier comprises a specific terpene resin (A) or a mixture of a terpene resin (A) and an aromatically modified terpene resin (B). In one embodiment, the terpene resin (A) and the terpene resin (B) have a weight average molecular weight Mw of 1000 or less and a softening point of 60° to 120° C. Here, "terpene" is the general term for the series of compounds having isoprene units. A "terpene resin" is a homopolymerized or copolymerized product mainly composed of oil obtained from pine tree resin or citrus fruit peel (e.g., α-pinene, β-pinene, dipentene (limonene), etc.). The terpene resin (A) usable in the present invention is preferably a copolymer of β-pinene and dipentene or a homopolymer of dipentene. The aromatically modified terpene resin (B) can be produced by causing the terpene resin (A) to co-condense with a phenol, alkylphenol, etc. A commercially available product may also be used. The amount of the aromatic modification of the aromatically modified terpene resin (B) is not particularly limited, but preferably is about 1 to 20% by weight based upon the weight of the terpene resin.

The ratio of the terpene-based resin (A)/the aromatically modified terpene resin (B) in the present invention may be changed according to the working environmental conditions (e.g., temperature, humidity, etc.) and the degree of tack of the tire members. If the ratio of the terpene resin is greater, the self tack and the tack to metal or vulcanized rubber are decreased and the workability is improved, while conversely if the ratio of the aromatically modified terpene resin is greater, the tack with the unvulcanized tire member is improved. In an embodiment, the present inventors found that, if (A):(B) is made 100:0 to 50:50 (weight ratio), preferably 100:0 to 70:30, a good balance thereof can be obtained.

The adhesive composition according to an embodiment may optionally contain therein, preferably at least in an outer adhesive layer when present, for further adjusting the tack, an internal mold release agent in an amount of 0.1 to 3 parts by weight, preferably 0.1 to 1 part by weight, based upon the total 100 parts by weight of the thermoplastic elastomer. As the internal mold release agent, for example, the generally used stearic acid or oleic acid and their metal salts etc. may be used. By compounding an internal mold release agent in this way, it is possible, in particular, to lower the self tack of the outer adhesive layer. By suitably adjusting the compounded amount when adjusting the tack so as to correspond to the changes in an air temperature etc., it is possible to maintain the optimal state of tack.

In another embodiment, the adhesive composition is substantially free of internal mold release agents, e.g., if present, present at no more than 0.1 parts by weight per 100 parts by weight of the adhesive composition. In another embodiment, the adhesive composition contains less than 0.1 parts by weight total per 100 parts by weight of the adhesive composition of stearic acid, oleic acid and metal salts thereof.

Any of the crosslinking or vulcanization cure packages mentioned above may be used in the adhesive compositions, e.g., sulfur, zinc oxide, and fatty acids and mixtures thereof; metal oxides (i.e., zinc oxide, ZnO), organometallic compounds, radical initiators, etc.; ZnO, CaO, MgO, $Al_2O_3$, $CrO_3$, FeO, $Fe_2O_3$, and NiO and the corresponding metal stearate complex (e.g., the stearate salts of Zn, Ca, Mg, and Al), or with stearic acid, and either a sulfur compound or an alkylperoxide compound. Suitable vulcanization cure packages for the adhesive compositions of one embodiment of the present invention include zinc oxide in combination with zinc stearate or stearic acid and, optionally, one or more of accelerators or vulcanizing agents. Curative accelerators include amines, guanidines, thioureas, thiazoles, thiurams, sulfenamides, sulfenimides, thiocarbamates, xanthates, and the like.

In one embodiment, as the cross-linking agent, an organic peroxide having a one-minute half-life temperature of 160° C. or more, preferably 165 to 190° C., is used for the crosslinking in an amount of 0.1 to 2 parts by weight, preferably 0.3 to 1 part by weight. As such an organic peroxide, specifically, for example, dicumyl peroxide, di-t-butyl peroxide, t-butylcumyl peroxide, benzoyl peroxide, 2,5-dimethyl-2,5-di(t-butylperoxy)hexine-3,2,5-dimethyl-2,5-di(t-butylperoxy)hexane, 1,3-bis(t-butylperoxyisopropyl)benzene, 4,4-di-t-butylperoxy-valerenate-n-butyl ester, etc. may be used.

According to an embodiment of the present invention, the adhesive composition in the adhesive layer can be placed between the thermoplastic elastomer composition in the barrier layer and a diene-based rubber, e.g., in a tire carcass, to form a laminate for use for a pneumatic tire.

Accordingly, a laminate according to the instant disclosure comprises an air permeation preventive layer and an adhesive layer, which may be formed in a cylindrical (tubular) shape with the air permeation preventive layer of the thermoplastic elastomer composition composed of a thermoplastic resin, as a continuous phase and a rubber composition, as a dispersed phase, at the inside of the tube and the adhesive composition at the outside of the tube, preferably which comprises superior adhesion to the air permeation preventive layer and superior bondability with a tire carcass. In another embodiment the laminate may be a sheet or strip, which can be formed by slitting the tubular shape from the blown film extrusion line and cutting and/or splicing to the desired size.

The compositions described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black, and the like. Reinforcing grade carbon black is preferred. A particularly useful grade of carbon black is Mitsubishi Carbon Black grade MA600, also identified as a medium color furnace black. However, carbon black, if used at all, is typically no more than about 5 parts per hundred of rubber (phr); preferably less than about 4 phr; more preferably less than about 3 phr; most preferably less than about 2 phr; for example, about 1 phr or less, such as about 0.1 to about 1.5 phr; for example about 0.25 to about 1.0 phr. In one embodiment, carbon black can be added to the adhesive layer and/or sublayer as a masterbatch, e.g., in a carrier resin such as polyethylene. Alternatively, useful compositions can be prepared without carbon black. The filler may also include other reinforcing or non-reinforcing materials such as silica, clay, calcium carbonate, talc, titanium dioxide and the like. The filler may be present at a level of from 0 to about 5 percent by weight of the rubber present in the composition; such as about 0.5 to about 4 wt %; or about 1.0 to about 3 wt %; such as about 1 to about 2 wt %.

Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl), tetrakis-(methylene-(3,5-di-(tert)-butyl-4-hydrocinnamate)) methane (IRGANOX 1010), etc. Examples of hindered phenolic antioxidants are commercially available under the IRGANOX series of trade designations including IRGANOX 565, IRGANOX 1010, IRGANOX 3052, and IRGANOX 1076 from Ciba Specialty Chemicals (Basel, Switzerland). In one embodiment, the adhesive composition comprises from 0.01 to 3 wt % of total antioxidant on an active or neat basis (excluding inerts in as-received commercially available antioxidant packages, and including any antioxidant in the blend components such as SBS), preferably from 0.05 to 2 wt %.

As discussed above, a process or plasticizer oil may be present in the compositions. Such oils are primarily used to improve the processing of the composition during preparation of the layer, e.g., mixing, calendering, etc. Generally, the process oil may be selected from paraffinic oils, aromatic oils, naphthenic oils, and polybutene oils. Rubber process oils also have ASTM designations depending on whether they fall into the class of paraffinic, naphthenic or aromatic hydrocarbonaceous process oils. The type of process oil utilized will be that customarily used in conjunction with a type of elastomer component and a skilled rubber chemist will recognize which type of oil should be utilized with a particular rubber in a particular application. For a thermoplastic elastomer composition the oil may be present at a level of 0 to about 20 wt % of the total composition; preferably oil is not included in order to maximize impermeability of the composition.

The composition of the adhesive layer in one embodiment has a self tack of less than 10 N/cm, preferably 1 to 6 N/cm. The composition of the outer adhesive layer in one embodiment has a self tack of less than 5N, for example, 1 to 4N. In one embodiment, the outer adhesive layer can have a tack to an unvulcanized diene-based rubber of 5N or more, for example, 7 to 20N. In one embodiment, the outer adhesive layer can have a tack to an unvulcanized diene-based rubber of 10 N/cm or more, preferably 20 to 50 N/cm. Tack is tested as disclosed in US2007/031661, i.e., by attaching a 1-cm wide strip of the laminate to the ring part of a commercial tack tester, and pressing the adhesive side perpendicularly with a force of 4.9 N for not more than 1 second against a 10 cm square piece cut from the same sheet in the case of self tack an against the unvulcanized rubber member in the case of tack to the unvulcanized rubber. The force when peeling the pieces apart is recorded as the tack (force per unit width, e.g., N/cm). The test is conducted at a peeling speed of 120 mm/min at 20° C. according to ASTM D3330.

In various embodiments, the total thickness of the adhesive layer is up to 600 microns, or from about 5 to 200 microns, or from about 5 to 100 microns, or from about 5 to 80 microns, or from about 5 to 70 microns, or from 10 to 50 microns.

Embodiments

Accordingly, the present invention provides the following embodiments:

A. A process to produce a laminate comprising: coextruding a dynamically vulcanized alloy with an adhesive composition through a die to produce a laminate comprising a film of the dynamically vulcanized alloy and a layer of the adhesive composition; wherein the dynamically vulcanized alloy comprises a thermoplastic elastomer composition containing a thermoplastic resin as a continuous phase, and a rubber composition dispersed therein, as a dispersed phase; wherein the adhesive composition comprises a vulcanizable elastomeric composition; providing a residence time of the adhesive composition in a molten state to partially scorch the vulcanizable elastomeric composition; providing a co-residence time in the die of a melt of the dynamically vulcanized alloy in contact at a surface with the melt of the adhesive composition of at least 5 seconds.

B. The process according to embodiment A, comprising changing an area of the contact surface between the dynamically vulcanized alloy melt and the adhesive composition melt during the co-residence time in the die.

C. The process according to embodiment B, comprising increasing the area of the contact surface between the dynamically vulcanized alloy melt and the adhesive composition melt during the co-residence time in the die by from 5% to 300% with respect to an initial area of contact surface.

D. The process according to any one of embodiments A to C, wherein the laminate has a Mocon air permeation coefficient of less than or equal to about $25 \times 10^{-12}$ cc cm/cm$^2$ sec cm Hg at 30° C.

E. The process according to any one of embodiments A to D, wherein the adhesive layer has a self-tack of less than about 10 N/cm.

F. The process according to any one of embodiments A to E, wherein the adhesive layer has a tack to an unvulcanized diene-based rubber of greater than or equal to about 10 N/cm.

G. The process according to any one of embodiments A to F, wherein the adhesive composition comprises from 0 to less than 0.1 percent by weight of the adhesive composition of an epoxidized styrene-butadiene-based block copolymer.

H. The process according to any one of embodiments A to G, wherein the thermoplastic of the continuous phase comprises a polyamide and wherein the rubber composition of the dispersed phase comprises a halogenated copolymer of isobutylene and paramethylstyrene.

I. The process according to any one of embodiments A to H, wherein the adhesive composition comprises an epoxidized styrene-butadiene-based block copolymer.

J. The process according to any one of embodiments A to H, wherein the vulcanizable elastomeric composition comprises one or more functionalized groups reactive with amine groups in the thermoplastic resin of the dynamically vulcanized alloy.

K. The process according to any one of embodiments A to J, further comprising co-vulcanizing the adhesive composition with the dynamically vulcanized alloy.

L. The process according to any one of embodiments A to K, wherein the dynamically vulcanized alloy is essentially free of added plasticizer.

M. The process according to embodiment L, wherein the dynamically vulcanized alloy comprises butylbenzylsulfonamide (BBSA), poly(isobutylene succinic anhydride), or a combination thereof.

N. The process according to any one of embodiments A to M, comprising a co-residence time of at least 7 seconds.

O. The process according to any one of embodiments A to N, comprising a co-residence time of 10 seconds or more.

P. The process according to any one of embodiments A to 0, further comprising incorporating the laminate into a tire as an innerliner.

Q. In a process for producing a laminate comprising coextruding a dynamically vulcanized alloy with an adhesive composition through a die to produce the laminate, wherein the dynamically vulcanized alloy comprises a thermoplastic elastomer composition containing a thermoplastic resin as a continuous phase, and a rubber composition dispersed therein, as a dispersed phase, wherein the adhesive composition comprises a vulcanizable elastomeric composition, wherein the vulcanizable elastomeric composition has a total residence time in a molten state to partially scorch the vulcanizable elastomeric composition in the laminate, and wherein there is a co-residence time of a melt of the thermoplastic elastomer composition in contact at a surface with a melt of the vulcanizable elastomeric composition in the die, a method to improve adhesion between the thermoplastic elastomer composition and the adhesive composition, comprising: providing a die to increase the co-residence time in the die to at least 5 seconds.

R. The method according to embodiment Q, further comprising changing an area of the contact surface between the dynamically vulcanized alloy melt and the adhesive composition melt during the co-residence time in the die.

S. The method according to embodiment R, comprising increasing the area of the contact surface between the dynamically vulcanized alloy melt and the adhesive composition melt during the co-residence time in the die by from 5% to 300% with respect to an initial area of contact surface.

T. The method according to any one of embodiments Q to S, wherein the laminate has a Mocon air permeation coefficient of less than or equal to about $25 \times 10^{-12}$ cc cm/cm$^2$ sec cm Hg at 30° C.

U. The method according to any one of embodiments Q to T, wherein the adhesive layer has a self-tack of less than about 10 N/cm.

V. The method according to any one of embodiments Q to U, wherein the adhesive layer has a tack to an unvulcanized diene-based rubber of greater than or equal to about 10 N/cm.

W. The method according to any one of embodiments Q to V, wherein the adhesive composition comprises from 0 to less than 0.1 percent by weight of the adhesive composition of an epoxidized styrene-butadiene-based block copolymer.

X. The method according to any one of embodiments Q to W, wherein the thermoplastic of the continuous phase comprises a polyamide and wherein the rubber composition of the dispersed phase comprises a halogenated copolymer of isobutylene and paramethylstyrene.

Y. The method according to any one of embodiments Q to X, wherein the adhesive composition comprises an epoxidized styrene-butadiene-based block copolymer.

Z. The method according to any one of embodiments Q to Y, wherein the vulcanizable elastomeric composition comprises functionalized groups reactive with amine groups in the thermoplastic resin of the dynamically vulcanized alloy.

AA. The method according to any one of embodiments Q to Z, further comprising co-vulcanizing the adhesive composition with the dynamically vulcanized alloy.

BB. The method according to any one of embodiments Q to AA, wherein the dynamically vulcanized alloy is essentially free of added plasticizer.

CC. The method according to embodiment BB, wherein the dynamically vulcanized alloy comprises butylbenzylsulfonamide (BBSA), poly(isobutylene succinic anhydride), or a combination thereof.

DD. The method according to any one of embodiments Q to CC, comprising a co-residence time of at least 7 seconds.

EE. The method according to any one of embodiments Q to CC, comprising a co-residence time of 10 seconds or more.

FF. The method according to any one of embodiments Q to EE, further comprising incorporating the laminate into a tire as an innerliner.

GG. A laminate produced according to the process or method according to any one of embodiments A to FF.

HH. A pneumatic tire comprising the laminate according to embodiment GG.

II. The process, method, laminate or pneumatic tire according to any one of embodiments A to HH wherein the die is in a blown film extrusion line.

Any range of numbers recited in the specification hereinabove or in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited.

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A process to produce a laminate comprising:
coextruding a dynamically vulcanized alloy with an adhesive composition through a die to produce a laminate comprising a film of the dynamically vulcanized alloy and a layer of the adhesive composition;
wherein the dynamically vulcanized alloy comprises a thermoplastic elastomer composition containing a thermoplastic resin as a continuous phase, and a rubber composition dispersed therein, as a dispersed phase and is extruded at a melt temperature in the range of 190° C. to 250° C.;
wherein the adhesive composition comprises a vulcanizable elastomeric composition and is extruded at a temperature in the range of 110° C. to 180° C.;
providing a residence time of the adhesive composition in a molten state to partially scorch the vulcanizable elastomeric composition; and
providing a co-residence time in the die of the melt of the dynamically vulcanized alloy in contact with a surface of the melt of the adhesive composition of at least 5 seconds.

2. The process of claim 1, comprising changing an area of the contact surface between the dynamically vulcanized alloy melt and the adhesive composition melt during the co-residence time in the die.

3. The process of claim 2, comprising increasing the area of the contact surface between the dynamically vulcanized alloy melt and the adhesive composition melt during the co-residence time in the die by from 5% to 300% with respect to an initial area of contact surface.

4. The process according to claim 1, wherein the laminate has a Mocon air permeation coefficient of less than or equal to about $25 \times 10^{-12}$ cc cm/cm$^2$ sec cm Hg at 30° C.

5. The process according to claim 1, wherein the adhesive layer has a self-tack of less than about 10 N/cm.

6. The process according to claim 1, wherein the adhesive layer has a tack to an unvulcanized diene-based rubber of greater than or equal to about 10 N/cm.

7. The process according to claim 1, wherein the thermoplastic of the continuous phase comprises a polyamide and wherein the rubber composition of the dispersed phase comprises a halogenated copolymer of isobutylene and paramethylstyrene.

8. The process according to claim 1, wherein the adhesive composition comprises an epoxidized styrene-butadiene-based block copolymer.

9. The process according to claim 1, wherein the vulcanizable elastomeric composition comprises functionalized groups reactive with amine groups in the thermoplastic resin of the dynamically vulcanized alloy.

10. The process according to claim 1, further comprising co-vulcanizing the adhesive composition with the dynamically vulcanized alloy.

11. The process according to claim 1, wherein the dynamically vulcanized alloy is essentially free of added plasticizer.

12. The process according to claim 1, wherein the dynamically vulcanized alloy comprises butylbenzylsulfonamide (BBSA), poly(isobutylene succinic anhydride), or a combination thereof.

13. The process according to claim 1, comprising a co-residence time of at least 7 seconds.

14. The process according to claim 1, comprising a co-residence time of 10 seconds or more.

15. The process according to claim 1, further comprising incorporating the laminate into a tire as an innerliner.

* * * * *